United States Patent [19]

Fuse

[11] Patent Number: 4,820,013

[45] Date of Patent: Apr. 11, 1989

[54] LED ARRAY HEAD

[75] Inventor: Masashi Fuse, Morioka, Japan

[73] Assignee: Alps Electric Co., Ltd., Japan

[21] Appl. No.: 118,845

[22] Filed: Nov. 9, 1987

[30] Foreign Application Priority Data

Jan. 6, 1987 [JP] Japan .................................. 62-473[U]
Jan. 13, 1987 [JP] Japan .................................. 62-5695

[51] Int. Cl.[4] .................................. G02B 6/08

[52] U.S. Cl. .................................. 350/96.27; 350/96.20; 357/30

[58] Field of Search .................. 350/96.24, 96.27, 96.10, 350/96.15, 96.20; 357/19, 17, 30; 355/1; 250/227

[56] References Cited

U.S. PATENT DOCUMENTS

| | | | |
|---|---|---|---|
| 4,715,673 | 12/1987 | Noro et al. | 350/96.20 |
| 4,732,446 | 3/1988 | Gipson et al. | 350/96.15 |
| 4,741,595 | 5/1988 | Onoda et al. | 350/96.27 |
| 4,743,091 | 5/1988 | Gelbart | 350/96.27 X |
| 4,744,623 | 5/1988 | Prucnal et al. | 350/96.20 |

FOREIGN PATENT DOCUMENTS

| | | | |
|---|---|---|---|
| 2710075 | 9/1978 | Fed. Rep. of Germany | 350/96.12 |
| 58-118145 | 7/1983 | Japan | 350/96.27 |
| 58-152218 | 9/1983 | Japan | 350/96.27 |
| 61-123805 | 6/1986 | Japan | 350/96.27 |

*Primary Examiner*—William L. Sikes
*Assistant Examiner*—Frank González
*Attorney, Agent, or Firm*—Guy W. Shoup; Paul J. Winters

[57] ABSTRACT

An LED array head which has a simplified structure and can be produced at a reduced cost. The LED array head comprises an LED array, a plurality of flexible printed circuits connected at faces thereof opposing to light emitting portions of the LED array to the LED array, an optical fiber bundle having an end face located in an opposing relationship to each of the light emitting portions of the LED array, and a common fiber plate in which the fiber bundles are mounted and on which the flexible printed circuits are supported. In producing the LED array head, the LED array is mounted on the opposing faces of the flexible printed circuits by a tape automated bonding system, and the fiber plate is located such that the end faces of the fiber bundles may oppose the light emitting portions of the LED array so as to support the flexible printed circuits on the fiber plate. A modified LED array is also disclosed.

2 Claims, 3 Drawing Sheets

LED ARRAY HEAD

BACKGROUND OF THE INVENTION

This invention relates to an LED (light emitting diode) array head which is used for an LED printer or like apparatus employing an electrophotographic technique and also to a process of producing such an LED array head.

General construction of a conventional LED printer in which an LED array head is used will first be described with reference to a schematic view of FIG. 6.

The LED printer shown in FIG. 6 includes a photosensitive drum 1 having a surface layer made of a photoconductive material. The photosensitive drum 1 is driven to rotate in a direction indicated by an arrow mark in FIG. 6. During such rotation, the drum 1 is charged uniformly by a charger 2 and is then exposed to light in accordance with information of a picture image to be recorded by an LED array head 3 in order to form an electrostatic latent image on the drum 1. The latent image is then developed by a developer 4 into a toner image which is subsequently transferred onto transfer paper 6 by a transfer device 5. The transfer paper 6 to which the toner image has been transferred is then advanced to a fixing device 7 at which the toner image is fixed to the paper 6. Meanwhile, the photosensitive drum 1 from which the toner image has been transferred is then cleaned by a cleaner 8 in order to allow subsequent re-use thereof.

Such LED array heads as the head 3 conventionally include an LED element array including a large number of LED chips arranged in a direction of printing columns as described hereinbelow, and a self-focusing type rod lens array for condensing light emitted from the LED elements of the element array to focus on a photosensitive drum.

An exemplary one of such conventional LED array heads will now be described with reference to FIG. 7. The LED array head 3 shown includes a large number of LED chips 32 die-bonded to a ceramics substrate 31, bonding wires not shown individually connected to the LED chips 32 and wire-bonded to respective light emitting portions of the LED chips 32 for energizing the LED light emitting portions, a cover glass 36 for protecting conductor patterns on the ceramics substrate 31 on which the LED chips 32 are mounted, a heat radiating plate 33 of aluminum or a like material on which the substrate 31 and the cover glass 36 are mounted, and a mounting plate 36 supported on the heat radiating plate 33 for mounting a self-focusing type rod lens array 34 thereon.

In such an LED array head 3 as described above, when the LED chips 32 are to be mounted in position on the ceramics substrate 31, the positioning tolerance for the linearity and so on must necessarily be within ±10 microns or so. Such positioning requires an optical technique involving a TV camera or a like device because the width of a pad for die bonding is 1.2 to 1.5 mm or so and is thus significantly great while the width of the LED chips 32 is 0.7 to 1 mm or so. Use of such an optical technique results in low efficiency in die bonding of LED chips and involves use of an expensive mounting apparatus.

Meanwhile, wire bonding must be done once for each of light emitting portions of each LED (each LED normally includes up to 64 light emitting portions). For example, in an LED array head for the A4 size and letter size having an integration density of 300 DPI (about 12 dots/mm) for ordinary use, up to 2560 wire bonds are required. Accordingly, even where a high speed wire bonding machine is employed, a time from 40 minutes to one hour is required for such bonding. Besides, even a single error among such 2560 wire bonds will result in rejection of the entire LED array head. Thus, very careful attention is required for wire bonding, which deteriorates the efficiency in production and raises the production cost.

Besides, since the accuracy in alignment of LED chips of an LED array head and the linearity in a direction of height of light emitting portions of the LED chips require such a high accuracy that the tolerance be within ±100 microns in the overall width of the LED array head (the width being 216 mm in A4 size or letter size), distortion or warping of a ceramics substrate itself must be restricted severely. Accordingly, a ceramics substrate of a high accuracy is required and therefore severe inspection is required for total number of ceramics substrates, which makes the ceraics substrates expensive.

In addition, there is a further drawback that, since a self-focusing type rod lens array is carried on a heat radiating plate on which a ceramics substrate is mounted, errors in dimension of those components will accumulate so that a required accuracy may not be assured. In the existing circumstances, the positioning tolerance of a self-focusing type rod lens array is within ±0.1 mm over the overall length of the same. Accordingly, optical confirmation of the positioning accuracy in mounting of a self-focusing type rod lens array cannot be eliminated, and it is necessary to provide an LED array head with a mechanism for enabling positioning the same with a high degree of accuracy, which raises the production cost from the points of a number of man-hours for assembly, an installation for manufacture, a quantity of parts and so on.

SUMMARY OF THE INVENTION

It is an object of the present invention to provide an LED array head which has a simplified structure and can be produced at a reduced cost.

In order to attain the object, according to one aspect of the present invention, there is provided an LED array head which comprises an LED array having a plurality of light emitting portions, a plurality of flexible printed circuits located in an opposing relationship to the light emitting portions and connected at faces thereof opposing to the light emitting portions of the LED array to the LED array, a plurality of fiber bundles each composed of a plurality of optical fibers and having end faces located in an opposing relationship to the light emitting portions of the LED array, and a common fiber plate in which the fiber bundles are mounted and on which the flexible printed circuits are supported.

According to another aspect of the present invention, there is provided a process for producing an LED array head which comprises a first step of mounting an LED array on faces of a plurality of flexible printed circuits opposing to a plurality of light emitting portions of the LED array by a tape automated bonding system, and a second step of locating a fiber plate in which a plurality of fiber bundles each composed of a plurality of optical fibers are mounted such that end faces of the fiber bundles may oppose to the light emitting portions of the LED array so as to support the flexible printed circuits on the fiber plate.

According to a further aspect of the present invention, there is provided an LED array head which comprises an LED array having a plurality of light emitting portions and having a plurality of corresponding back electrodes formed thereon, a fiber plate having a plurality of electrodes formed thereon, the LED array being connected to the electrodes of the fiber plate such that the light emitting portions of the LED array may oppose to a face of the fiber plate, a flexible printed circuit connected to each of the back electrodes of the LED array, and a plurality of fiber bundles each composed of a plurality of optical fibers and mounted in the fiber plate such that end faces thereof may oppose to the light emitting portions of the LED array.

Thus, according to the present invention, following effects can be anticipated:

(1) Since the LED chips are mounted on the flexible printed circuits by a tape automated bonding system, a wire bonding step which is required in conventional techniques can be omitted. Consequently, the number of steps can be reduced, the production efficiency can be improved and the production cost can be reduced accordingly;

(2) Since the optical fibers have no focus in contrast to the prior art self-condensing type rod lens array, the distance between the light emitting portions of the LED array and an object for exposure can be reduced, and accordingly the overall size of the device can be reduced;

(3) Since most of light emitted from the light emitting portions of the LED array will enter the fiber bundles and thus be irradiated upon an object for exposure with a high efficiency, the electric current to be supplied to the LED array can be reduced, and accordingly the life of the LED array can be improved;

(4) Particularly where glass is used for the fiber plate, a fine electrode pattern can be formed readily using a thin film forming process because the glass has a very smooth surface, and the LED chips can be positioned readily with an aimed degree of accuracy because the fiber plate can be produced with a high degree of accuracy free from distortion and so on;

(5) Since the flexible printed circuit is connected to the back electrodes of the LED array, heat generated in the LED array will escape therefrom by way of the flexible printed circuit. Accordingly, a high heat radiation can be assured; and (6) Since the flexible printed circuits can be bonded collectively without being influenced by a dispersion in height of the LED array, the workability in assembly can be improved and the efficiency percentage can be improved.

In addition, since the bundle of optical fibers is mounted directly in the fiber plate, the quantity of parts can be reduced and the structure can be simplified.

The above and other objects, features and advantages of the present invention will become apparent from the following description and the appended claims, taken in conjunction with the accompanying drawings.

DETAILED DESCRIPTION OF THE PREFERRED EMBODIMENTS

At first, an LED array head according to a first embodiment of the present invention will be described with reference to FIGS. 1 to 4.

Figure 1:
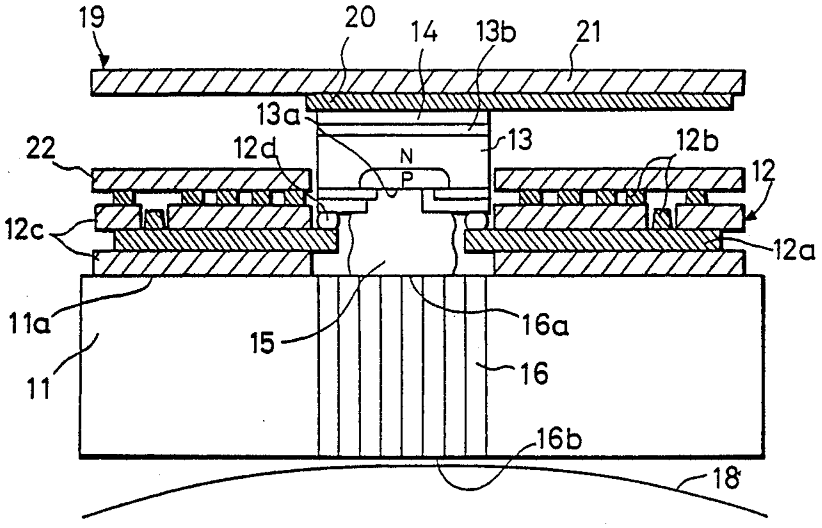
FIG. 1 is a diagrammatic cross sectional view of an LED array head showing a first embodiment of the present invention.
Figure 2:
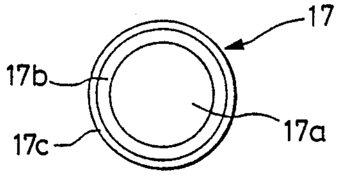
FIG. 2 is a diagrammatic cross sectional view of an optical fiber.
Figure 4:
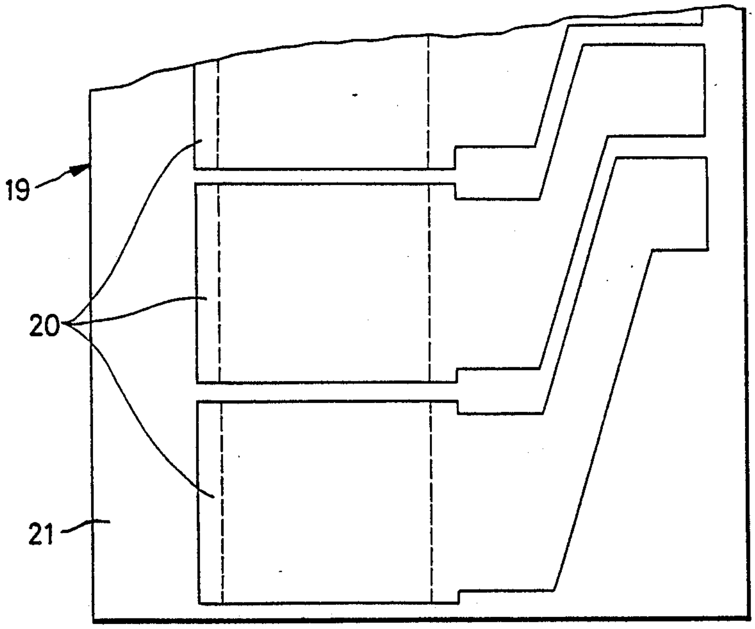
FIG. 4 is a diagrammatic plan view of another flexible printed circuit of the LED array head of FIG. 1.

Referring first to FIG. 1, the LED array head shown includes a fiber plate 11 made of glass or a like material, and a flexible printed circuit (hereinafter referred to as an FPC) 12 formed in two overlapping layers on a surface 11*a* of the fiber plate 11 and made of a polyimide material 12*c*. The two layers of FPC 12 have desired fine electrode patterns 12*a*, 12*b* of copper foil formed thereon. An LED chip 13 is bonded to each of the electrode patterns 12*a* by solder bumps 12*d* (i.e., as a flip chip) in such a manner that a light emitting portion 13*a* thereof may oppose to the FPC 12. Further, a back electrode 13*b* on the rear face of the LED chip 13 is connected to a grounding pattern 20 of another FPC 19 by means of silver paste 14. It is to be noted that the FPC 19 hae such a structure that the grounding pattern 20 made of copper foil is formed on a polyimide plate 21 as seen in FIG. 4. In order to prevent possible short-circuiting between the FPC 19 and the first-mentioned FPC 12, an insulating layer 22 is located over a top face of the FPC 12. Located in an opposing relationship to the light emitting portion 13*a* of each of the LED chips 13 via a respective transparent block 15 of a synthetic resin material having a high refractive index is one end face 16*a* of a fiber bundle 16 which is composed of a large number of optical fibers 17 having a diameter of 10 to 25 microns as hereinafter described and is mounted in the fiber plate 11. It is to be noted that the aforementioned optical fibers 17 have a three layer structure including, as shown in FIG. 2, a core 17*a* made of a glass material having a high coefficient of refraction, a clad 17*b* formed around an outer periphery of the core 17*a* and made of a glass material having a lower refractive index, and an absorbing body 17*c* formed on an outer periphery of the clad 17*b* and made of a carbon or a like material.

In the LED array head having such a construction as described above, light emitted from the light emitting portion 13*a* of each of the LED chips 13 is, as seen in FIG. 1, first introduced, via the corresponding transparent synthetic resin block 15, into the fiber bundle 16 by way of the one end 16*a* of the fiber bundle 16 and is transmitted within the fiber bundle 16 with a high efficiency whereafter it goes out from the outer end 16*b* of the fiber bundle 16 and is irradiated upon a surface of an object 18 for exposure such as a photosensitive drum.

Now, a process of producing the LED array head of the embodiment described above will be described.

Figure 3:
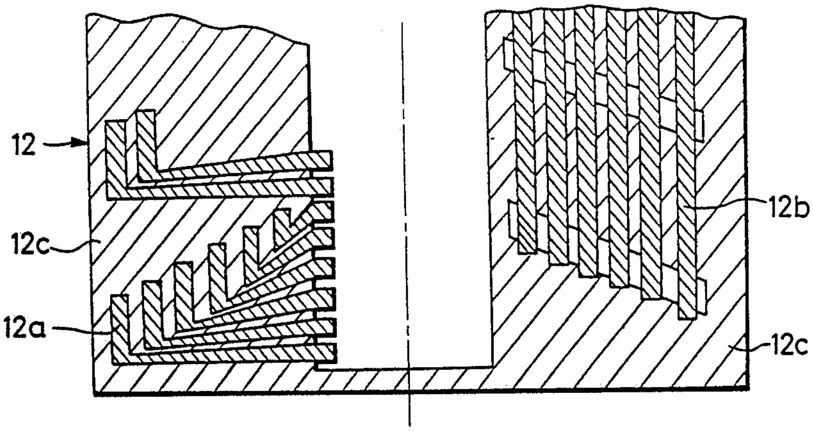
FIG. 3 is a diagrammatic plan view of flexible printed circuits, before working, of the LED array head of FIG. 1.

At first, electrode patterns 12*a*, 12*b* for the first and second layers of two layered FPCs are formed at a time on a single polyimide film as seen in FIG. 3, and the polyimide film is cut as long a dot and dash line in FIG. 3 into two pieces. Then, the two cut polyimide films are placed one on the other and are welded to each other by high current pulses so as to form an FPC set having two electrode patterns formed thereon. After then, the electrode patterns 12*a* of the FPC 12 and an LED array 13 are connected to each other by a TAB (tape automated bonding) system. Subsequently, a fiber plate 11 in which a fiber bundle 16 is mounted is adhered to the FPC 12 in order to secure them to each other. In this instance, a synthetic resin material 15 is inserted between each of the light emitting portions 13*a* of the LED array 13 and the opposing fiber bundle 16. Finally, silver paste 14 is applied to the rear face electrode 13*b* of the LED array 13 and the grounding patterns 20 of FPC 19 are connected to the rear face electrode 13*b* of the LED array 13, whereafter the entire block is baked at a temperature of about 150 C., thereby completing the LED array head of the present embodiment.

Figure 5:
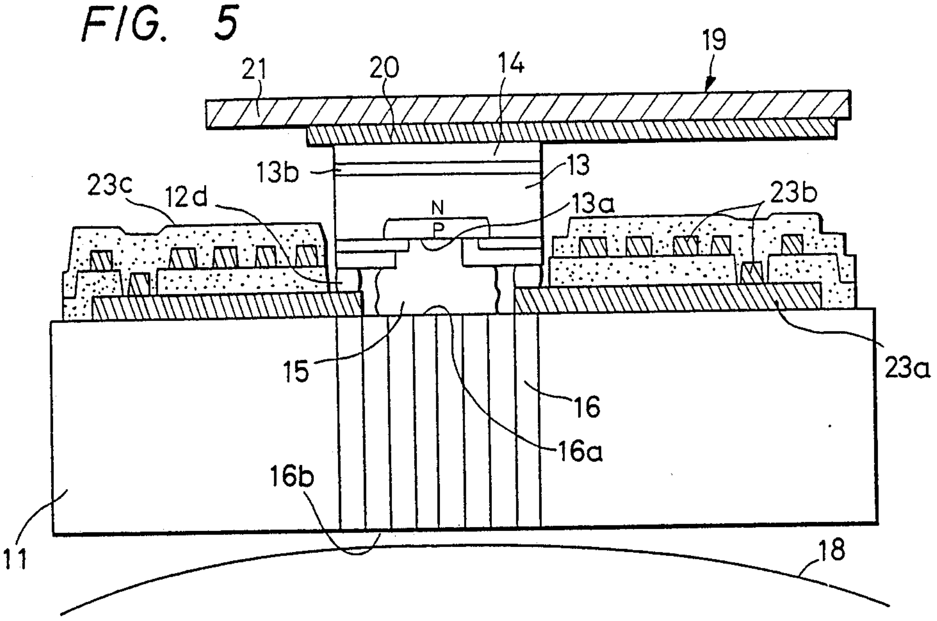
FIG. 5 is a diagrammatic cross sectional view of an LED array head showing a second embodiment of the present invention.
Figure 6:
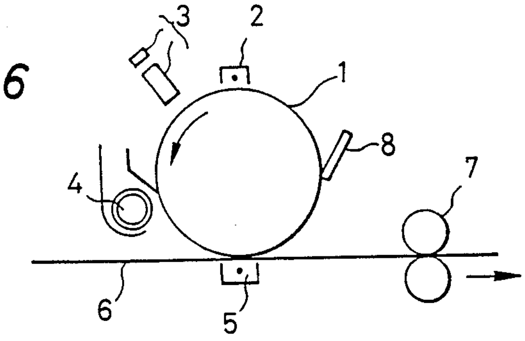
FIG. 6 is a schematic view illustrating general construction of an ordinary LED printer.
Figure 7:
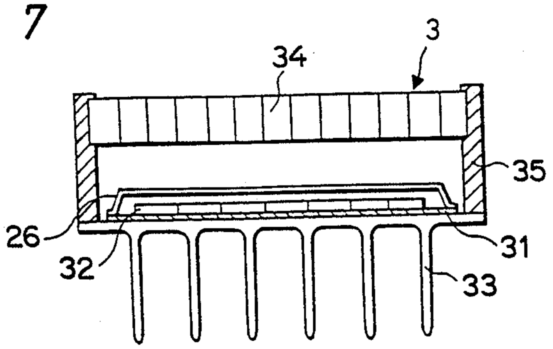
FIG. 7 is a diagrammatic cross sectional view of a conventional LED array head.

Now, an LED array head according to a second embodiment of the present invention will be described with reference to FIG. 5. In FIG. 5, like parts or members are denoted by like reference symbols to those of the first embodiment of FIGS. 1 to 4.

The LED array head shown includes a fiber plate 11 made of glass or a like material, and a large number of desired fine electrode patterns 23*a*, 23*b* formed in an overlapping relationship on a surface of the fiber plate 11 using a thin film forming process. An insulating layer 23*c* is formed over an entire face of the electrode patterns 23*a*, 23*b*. An LED chip 13 is bonded on each of the electrode patterns 12*a* by solder bumps 12*d* (i.e., as a flip chip) in such a manner that a light emitting portion 13*a* thereof may oppose to the fiber plate 11. Further, a back electrode 13*b* of each of the LED chips 13 is connected with a grounding pattern 20 of another FPC 19 by means of silver paste 14. Located in an opposing relationship to the light emitting portion 13*a* of each of the LED chips 13 via a transparent block 15 of a synthetic resin material having a high refractive index is one end face 16*a* of a fiber bundle 16 which is composed of a large number of optical fibers 17 having a diameter of 10 to 25 microns and is mounted in the fiber plate 11.

In the LED array head having such a construction as described above, light emitted from the light emitting portion 13*a* of each of the LED chips 13 is, similarly as in the first embodiment shown in FIG. 1, first introduced, via the transparent synthetic resin block 15, into the opposing fiber bundle 16 by way of the one end 16*a* of the fiber bundle 16 and is transmitted within the fiber bundle 16 with a high efficiency whereafter it goes out from the outer end 16*b* of the fiber bundle 16 and is irradiated upon a surface of an object 18 for exposure such as a photosensitive drum.

Having now fully described the invention, it will be apparent to one of ordinary skill in the art that may changes and modifications can be made thereto without departing from the spirit and scope of the invention as set forth herein.

What is claimed is:

1. An LED array head comprising:

a plurality of LED array chips each having a plurality of light emitting portions;

a fiber plate having fiber bundles mounted therein which are composed of a plurality of optical fibers having substantially no self-focusing characteristic; and flexible printed circuits having electrode patterns formed thereon supported on the fiber plate;

wherein each of the LED array chips is supported on one of the flexible printed circuits with the light emitting portions of the LED array chip opposing one end face of the fiber bundles and connected to the electrode pattern of the flexible printed circuit.

2. An LED array head comprising:

a plurality of LED array chips each having a plurality of light emitting portions and mounted on a substrate as a flip chip such that the light emitting portions of each LED array chip oppose the substrate;

flexible printed circuits arranged at a rear surface of each of said LED array chips; and a plurality of fiber bundles having substantially no self-focusing characteristic, each bundle including a plurality of optical fibers of which one end of each fiber is near one of the light emitting portion of one of the LED array chips, the plurality of fiber bundles being mounted in the substrate.

* * * * *